United States Patent [19]

Luettgen

[11] Patent Number: 4,756,193

[45] Date of Patent: Jul. 12, 1988

[54] PRESSURE SENSOR

[75] Inventor: Michael J. Luettgen, Kokomo, Ind.

[73] Assignee: Delco Electronics Corporation, Kokomo, Ind.

[21] Appl. No.: 95,462

[22] Filed: Sep. 11, 1987

[51] Int. Cl.[4] .......................... G01L 9/06; G01L 27/00
[52] U.S. Cl. .................................... 73/756; 29/621.1; 73/4 R; 73/721; 73/727; 73/DIG. 4; 338/4
[58] Field of Search ................ 73/756, 721, 727, 720, 73/726, 719, 717, 718, 4 R, 4 V, DIG. 4, 723, 724, 725, 754, 753, 431; 338/4; 29/610 SG

[56] References Cited

U.S. PATENT DOCUMENTS

| | | | |
|---|---|---|---|
| 3,858,150 | 12/1974 | Gurtler et al. | 338/2 |
| 4,033,787 | 7/1977 | Marshall | 148/1.5 |
| 4,295,117 | 10/1981 | Lake et al. | 73/4 R |
| 4,372,803 | 2/1983 | Gigante | 156/626 |
| 4,456,901 | 6/1984 | Kurtz et al. | 338/4 |
| 4,618,397 | 10/1986 | Shimizu et al. | 156/628 |
| 4,708,012 | 11/1987 | Folk et al. | 73/4 R |

OTHER PUBLICATIONS

J. A. Oakes, "A Pressure Sensor for Automotive Application," *Proceedings of the Third International Conference on Automotive Electronics*, pp. 143-149, Oct. 20-23, 1981, London, England, sponsored by the Institute for Mechanical Engineers.

*Primary Examiner*—Donald O. Woodiel
*Attorney, Agent, or Firm*—Robert J. Wallace

[57] ABSTRACT

A pressure sensor includes a pressure sensitive element and associated integrated circuitry on a common silicon chip. Fusible links in a conditioning network of the integrated circuit are opened by electrical pulses applied to pinouts that are accessible for probing in a trough in the support housing that is exposed during the testing and adjusting phase, but is sealed off by the cover in the final assembly so that the pinouts are no longer accessible.

6 Claims, 2 Drawing Sheets

PRESSURE SENSOR

FIELD OF THE INVENTION

This invention relates to pressure sensors and more particularly to the packaging of such sensors.

BACKGROUND OF THE INVENTION

Pressure sensors are used in automotive vehicles for a variety of purposes, for example, for sensing the vacuum pressure at the intake manifold of a vehicle's engine. Typically such sensors include a pressure sensitive element, such as a piezoresistive silicon element that is integrated with silicon circuitry in a monolithic silicon chip. Generally, the sensor needs to be calibrated to permit compensation for the variations that tend to occur between individual pressure sensitive elements. To this end, it is advantageous to include as part of the integrated circuit, a conditioning network that permits custom adjustment of the output parameters of individual sensors. This conditioning network typically is a network of parallel resistors, of which some may be selectively removed from the integrated circuit by opening fusible links in the network.

In prior art pressure sensors, such fusible links have typically been opened optically by irradiation of selected fusible links with laser pulses to burn open such links selectively. This proves difficult in a manufacturing environment where such adjustment is preferably made.

SUMMARY OF THE INVENTION

In accordance with the present invention, the adjusting or trimming of the conditioning network, usually a resistive network, is done electrically by means of electrical pulses appropriately applied to temporarily exposed pinouts of the resistive network to open up selected fusible links in the conditioning network. While the use of electrical pulses to open up fusible links in a resistive network was previously known, its extension specifically to pressure sensors is believed to be novel. Moreover, to better adapt such technique to the adjustment of pressure sensors, there has been devised a novel structure for packaging or housing the pressure sensor.

More particularly, for the practice of the present invention, the package assembly used for the pressure sensor includes a support housing member that is provided with a groove or trough around its periphery. In the trough there are located pinouts of leads to fusible links of the conditioning network of the pressure sensor. During the adjustment phase, a temporary cover, known in the testing art as a boot, is used to close off the atmosphere to the pressure sensitive element, while leaving uncovered the trough to permit easy access to the pinouts. For adjustment, probes are applied to the pinouts to supply electrical pulses to the leads for selectively opening fusible links. After the adjusting phase is complete, a permanent cover is sealed over the support housing to close off the pressure sensor from the atmosphere. To this end the permanent cover is designed to serve as the tongue, while the trough serves as the groove, of a tongue-in-groove joint. As a result, the pinouts to the conditioning circuit are effectively neutralized after the adjustment is complete and the pressure sensor is in its final form.

The invention will be better understood from the following more detailed description taken in conjunction with the accompanying drawings.

DETAILED DESCRIPTION OF THE INVENTION

Figure 1:
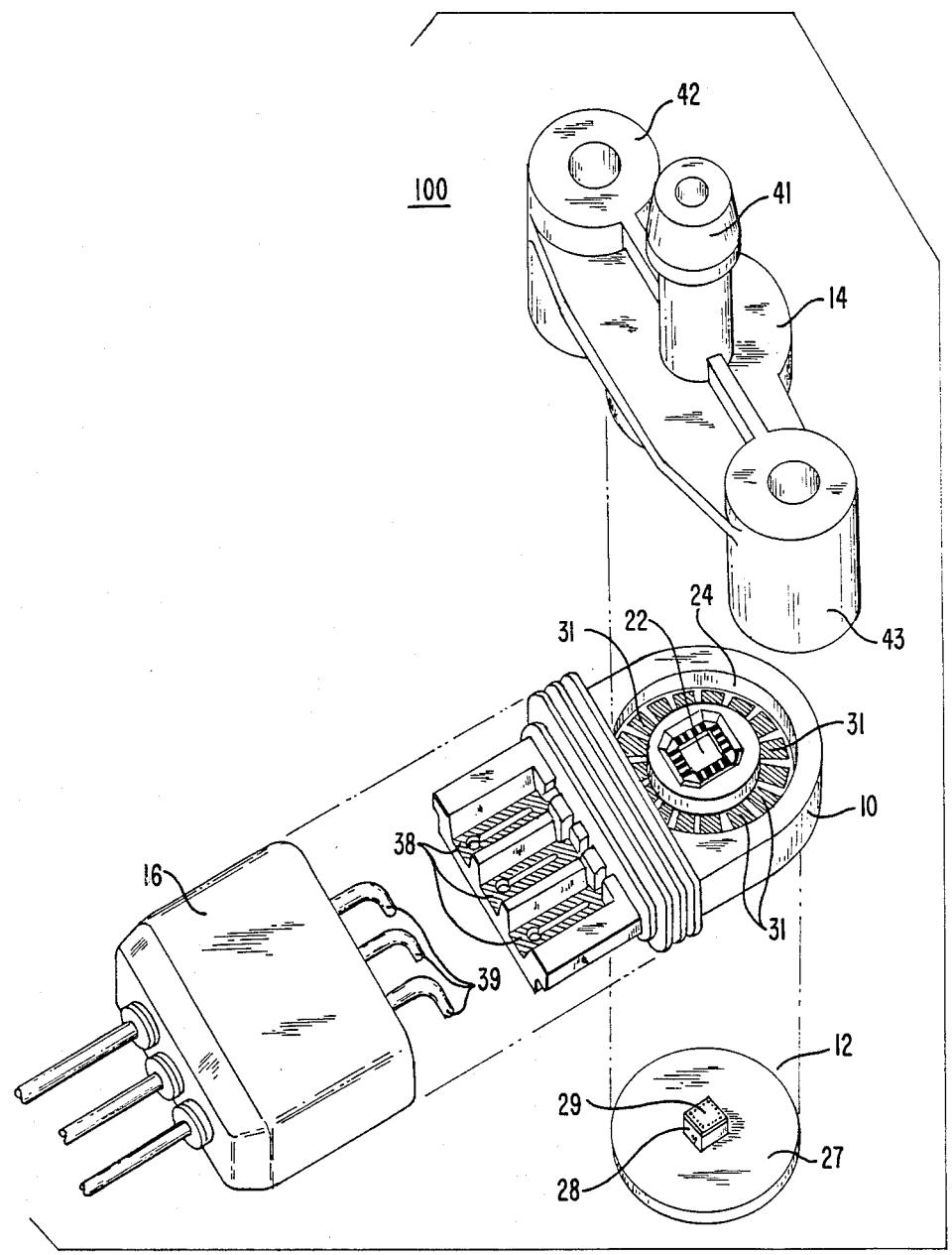
FIG. 1 is an exploded perspective view showing the basic elements of a pressure sensor in accordance with an illustrative embodiment of the invention.

Referring now to FIG. 1, there is shown exploded, the separate parts of a pressure sensor 100 in accordance with the invention. These include a basic support housing member 10 within which is supported an integrated circuit assembly 12, over which will be sealed a ported cover member 14, and into which will be plugged an electrical plug member 16.

Figure 2:
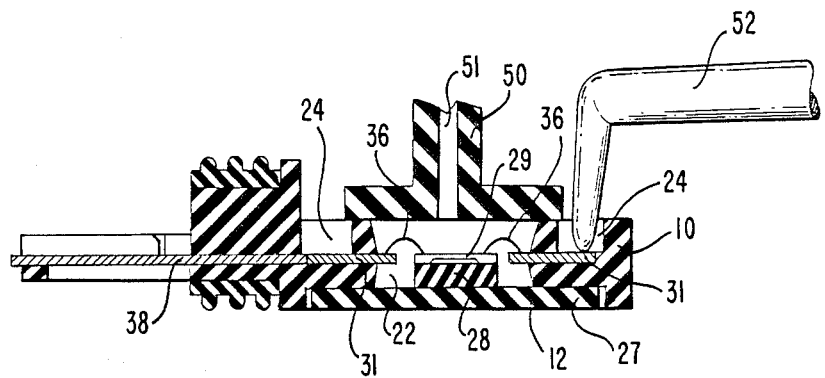
FIG. 2 is a longitudinal cross-sectional view of portions of the sensor shown in FIG. 1, partially assembled for the testing and adjusting stage, with a boot substituted for its permanent cover and its male electrical plug omitted.

Referring now to FIG. 2, there is shown a cross-sectional view of portions of the pressure sensor 100 of FIG. 1 with the integrated circuit assembly 12 in place in the support housing member 10 but with a ported boot 50 substituted for the permanent cover 14 and with the electrical plug member 16 omitted. The support housing member 10 includes a central pressure chamber portion 22, the lower end or base of which is closed off by the pressure sensitive integrated circuit assembly 12. As best seen in FIG. 1, the integrated circuit assembly 12 includes a closure portion 27 on which is mounted an insulating support member 28 on which in turn is supported a silicon chip 29. In the chip 29 are integrated in the usual fashion a pressure sensitive element and its associated circuitry including a conditioning network. Although the chip 29 is not shown in detail, the pressure sensitive element typically is a thinned diaphragm portion of the silicon chip that is piezoresistive for transforming strain imposed by the pressure being monitored to a resistive change of one or more legs of a Wheatstone bridge included in the integrated circuit. During the testing and adjusting phase, as will be discussed more fully later, the pressure chamber 22 is closed off to the atmosphere by the ported boot 50. The housing support member 10 also includes a concentric trough 24 surrounding the pressure chamber portion 22.

As best seen in FIG. 1, the bottom of trough 24 includes a number of pinouts 31, circumferentially spaced around the trough, and these pinouts are connected to appropriate conductive pads (not shown) on the silicon chip 29 by way of wire bonds 36 as seen in FIG. 2. These pinouts, as will be discussed below, permit access for trimming to fusible links of the resistive network included in the integrated circuit for permitting final adjustment, as previously mentioned.

Additionally, the silicon chip 29 will include three pads (not shown) for external interfacing of the integrated circuit. These pads are connected by way of wire bonds 36 to leads of a lead frame 38 into which fits the three prongs 39 of the plug member 16 to complete the plug assembly.

In the preliminary assembly for the testing and adjusting phase, the ported cover 14 is left off and instead a boot 50 including a port 51 by which test pressure is applied, as seen in FIG. 2, is used to close pressure chamber portion 22 off to the atmosphere so that prescribed pressures may be supplied by way of the restricted opening 51 in the boot to the pressure sensitive element of the silicon chip. While the boot 50 is in place, the pinouts 31 in the trough 24 are exposed so that probes may be applied thereto by means of which electrical pulses can be supplied to the chip. In FIG. 2, there is shown one such probe 52, positioned to contact the pinout 31. These probes are used both for testing and for burning open appropriate ones of the fusible links in the resistive network to achieve the necessary trimming of such resistive network. Typically, a multiple of pinouts are provided for this purpose. The use of electrical pulses for burning open fusible links for trimming resistive networks is known in the microelectronics art and so will not be described in further detail here.

After completion of the testing and adjusting phase, the pressure sensor is ready for final assembly.

Figure 3:
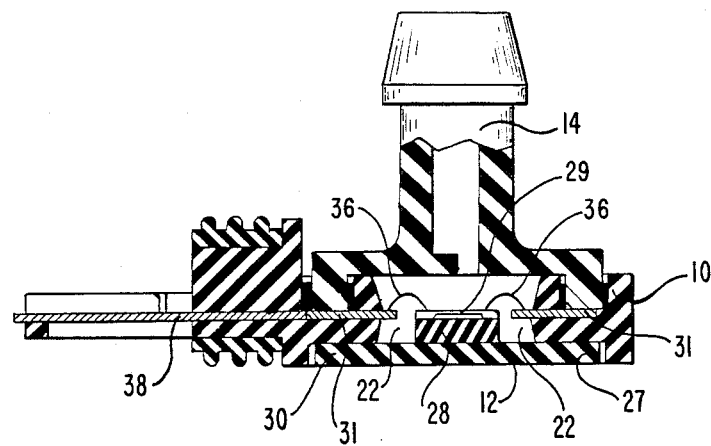
FIG. 3 is a similar cross-sectional view of portions of the sensor shown in FIG. 1 after the boot has been replaced by the permanent cover with the male electrical plug still omitted.

Referring now to FIG. 3, there is shown a cross-sectional view of portions of the pressure sensor 100 of FIG. 1 with the ported cover 14 replacing the boot 50 of FIG. 2. The boot 50 of FIG. 2 is first removed and then an appropriate sealant/adhesive is placed in the trough 31. The trough 31 doubles as the groove portion of a tongue-in-groove joint with the end of the ported cover 14 used as the tongue portion. Ported cover 14 is then put in place and the sealant/adhesive is cured to make a permanent joint between the cover 14 and the support housing member 10 sealing the pressure chamber 22 off from the atmosphere. The cover 14 includes the two mounting portions 42 and 43, by means of which the pressure sensor may be screwed into place where desired, and a central ported portion 41 that is connected to the intake manifold (not shown) of a vehicle (not shown) typically with a rubber hose (not shown). In this way the pressure at the intake manifold is supplied by way of the opening or port in portion 41 to the pressure sensitive element of chip 29 of the sensor.

It will be characteristic of the final device that the pinouts 31 and the leads thereto will be effectively isolated, if the overlying cover 14 is a good insulator. To this end, the cover typically is of suitable thermoplastic material.

It will be recognized that the invention permits the testing and adjusting to be done without requiring that the entire package, probes or test equipment be enclosed in any special low pressure atmosphere. Moreover, the testing and adjusting does not require physical or optical access to the surface of the integrated circuit chip.

It should be understood that the specific embodiment described is illustrative of the basic principles of the invention and that various modifications may be devised without departing from the spirit of the invention. It, for example, is possible for the pressure sensitive element of the sensor be in one discrete chip and the conditioning circuit in a separate chip. It is also feasible for the conditioning network to be on a chip separate from the rest of the circuitry.

The embodiments of the invention in which an exclusive property or privilege is claimed are defined as follows:

1. A pressure sensor comprising:
   a semiconductor circuit means including a pressure sensitive element and associated circuitry having a conditioning network including a plurality of fusible links, the selected openings of which may be used to vary the output parameters of the pressure sensor;
   a package assembly for said circuit means including a support housing member and a ported cover member, the support housing member including a trough surrounding a central pressure chamber within which is positioned the semiconductor circuit means; and
   a plurality of pinouts positioned in said trough to which are electrically coupled the fusible links of said conditioning network and that are adapted to have applied thereto electrical pulses for burning out selected ones of said fusible links, the pinouts being exposed before assembly of the cover member, and after assembly of the cover member, the pinouts being covered by the cover member.

2. The pressure sensor of claim 1 in which the conditioning network is a network of parallel resistors.

3. The pressure sensor of claim 1 in which the trough is adapted to be a groove and a portion of the cover member is adapted to be a tongue in a tongue-in-groove joint between the support housing and the cover member.

4. The pressure sensor of claim 3 in which the trough is adapted to be exposed when a boot is positioned over the pressure chamber for enclosing such pressure chamber during testing and adjusting.

5. The pressure sensor of claim 4 in which the circuit means comprises a monolithic silicon chip which includes the pressure sensitive element and the associated circuitry including the conditioning network.

6. In the manufacture of a pressure sensor that includes a semiconductor chip that comprises a pressure sensitive element and associated circuitry including a conditioning network by means of which the output parameters of the sensor may be adjusted before final assembly and a package for housing said chip including a cover member and a support housing for said chip, the support housing including a pressure chamber portion and a surrounding trough portion in which are provided pinouts that are connected to fusible links in the conditioning network, whose openings may be used to adjust the output parameters of the sensor, the steps before the assembly of the cover member of enclosing the pressure chamber with a boot while leaving exposed the trough for testing the pressure sensor and adjusting its parameters by way of probes applied to the pinouts for opening selected fusible links of the conditioning network, and after such testing and adjusting, sealing the cover member to the support housing for enclosing the pressure chamber by means of a portion of the cover member that fits into the trough and covers the pinouts.

* * * * *